Sept. 5, 1950     P. J. MITCHELL, JR     2,521,243
MANUFACTURE OF NUT BUTTER
Filed Feb. 19, 1948     2 Sheets-Sheet 1
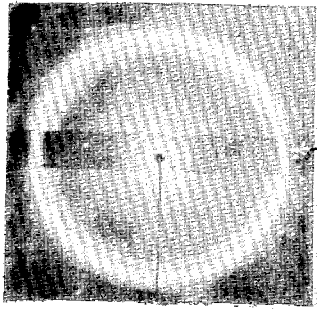
ALPHA
4.14 Å
FIG. 1ᵃ
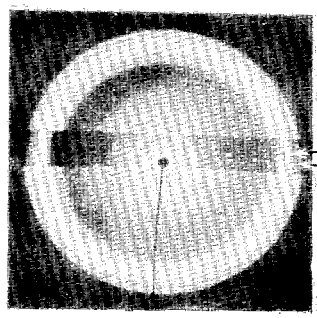
BETA PRIME
4.18 Å
3.78 Å
FIG. 1ᵇ
CENTIMETERS
FIG. 1ᶜ
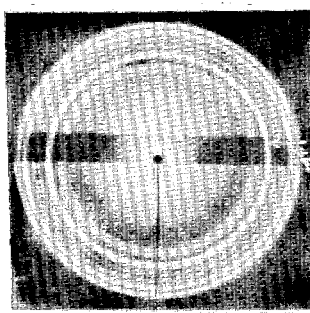
BETA
4.61 Å
3.84 Å
3.68 Å
Inventor
Paul J. Mitchell, Jr.
By Watson, Cole, Grindle & Watson
Attorneys

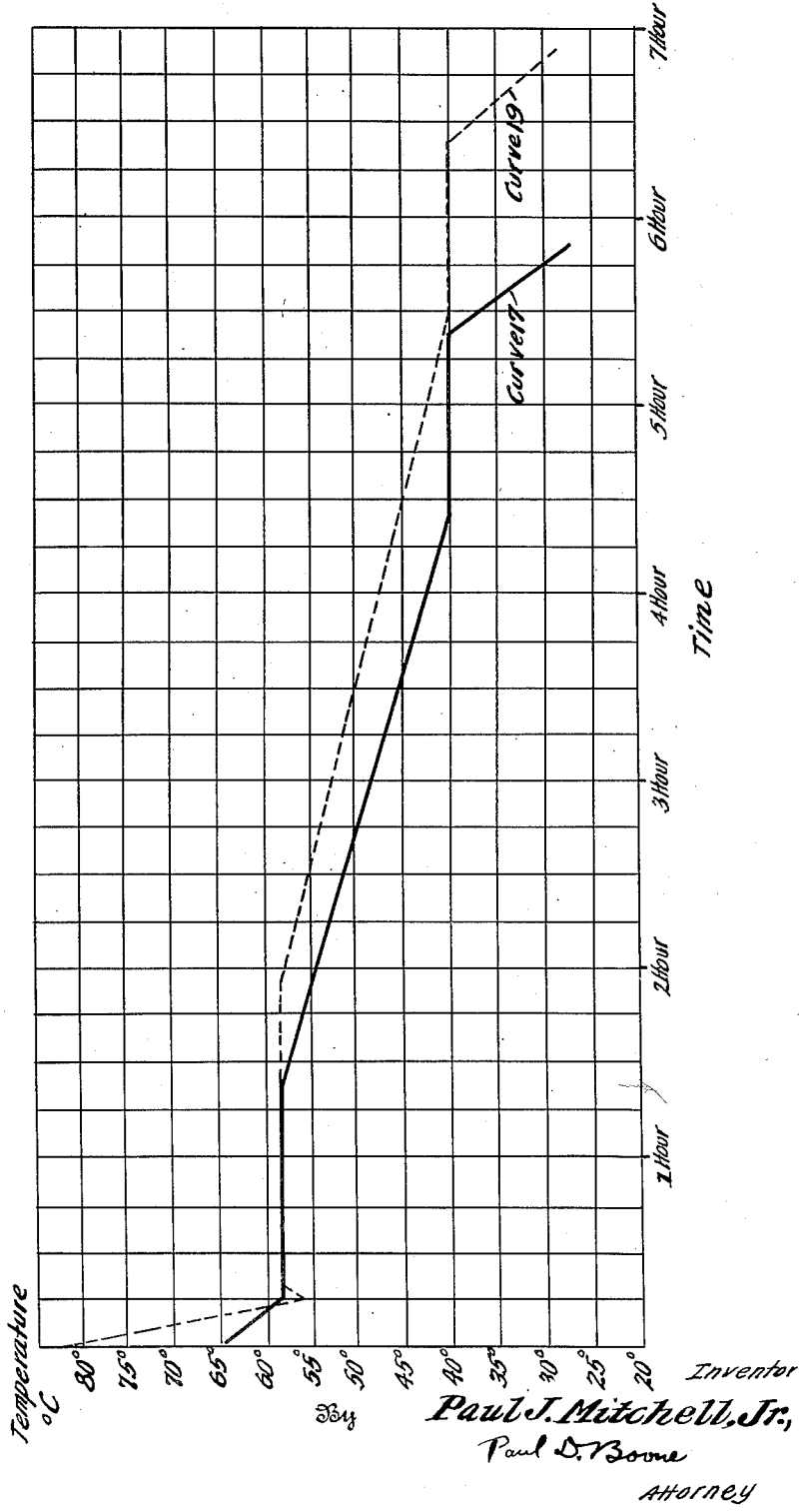

Patented Sept. 5, 1950

2,521,243

UNITED STATES PATENT OFFICE 2,521,243

MANUFACTURE OF NUT BUTTER

Paul J. Mitchell, Jr., Griffin, Ga., assignor, by mesne assignments, to The Procter & Gamble Company, Cincinnati, Ohio, a corporation of Ohio Application February 19, 1948, Serial No. 9,560

6 Claims. (Cl. 99—128)

This invention relates to an improved method of preparing nut and seed butters, to an improved edible nut butter product, and to an improved oleaginous homogenizing agent for use in such product.

In the following specification and appended claims, terms such as "homogenizing," "homogeneity," "homogeneous," "homogenization," and the like, as applied to nut and seed butters and their manufacture, relate to uniformity in qualities such as texture, appearance, and consistency, and are not used in the strict physical chemical sense.

The tendency of the fluid and solid ingredients of nut butters to separate on standing is well known, particularly in the case of peanut butter, a widely used edible composition. Peanut butter, prepared by grinding the nut kernels, consists essentially of a mixture of solid nut particles and the natural peanut oil which is liberated from the nut in the process. In the absence of special preventive precautions, the solid particles gravitate on standing, and the peanut oil collects in a layer on the surface. The product thereby becomes unsightly, and if it is not rendered homogeneous by stirring, difficulties and disadvantages are encountered in its use, as in spreading on bread, or in mixing with other food ingredients, or in eating, the compacted settled portion becoming increasingly stiff, dry, and unpalatable with progressive consumption.

It is known that these defects can be overcome to some extent by the use of suitable agents, for instance, by incorporating with the nut butter liquid fatty materials of more saturated nature than peanut oil which tend to retard segregation, probably by crystallizing on cooling and forming a network of crystals throughout the natural oil. However, the relatively hard fats required for effective immobilization, such as hydrogenated oils, offer practical difficulties in handling and mixing because of their inherent high melting properties, and are not well suited for use in continuous processes. Mixtures of hard fats and liquid oils, which have been heretofore proposed and which have relatively lower melting characteristics and are readily handled and mixed, are necessarily high in liquid oil content and unduly increase the total quantity of oil in the nut butter. In the use of such mixtures the amount of hard fat so incorporated in nut butters is consequently inadequate to maintain the homogeneity of the mixture over a substantial period of time.

It is, therefore, an object of the present invention to retard or eliminate segregation in nut and seed butters by the addition thereto of a mixture of normally solid and liquid oleaginous constituents in which the solid constituent is present in amount sufficient to ensure the desired result. I have found that such a mixture even though substantially solid or very stiff in consistency as conventionally produced may be prepared so as to possess a pumpable or pourable consistency, thereby facilitating handling and mixing with the butter. Further, when prepared by my preferred process, the mixture remains pumpable under normal storage and shipping conditions, but after the mixture is incorporated with the nut butter under conditions which effect melting of the solid constituent, the solid constituent crystallizes on cooling in such a way as to immobilize the liquid constituents of the nut butter mixture.

More specifically, it is an object of the invention to improve the properties of nut and seed butters by the addition thereto of a suspension of a high proportion of solid triglyceride in liquid fatty esters of high molecular weight, the suspension being preferably prepared for example as described and claimed in my copending application, Serial No. 784,358, so as to exhibit and maintain a pumpable consistency over the normal range of room temperature, but to acquire a stiff consistency when melted and allowed to cool spontaneously. These and other desirable characteristics of the suspension are apparently attributable at least in part to the crystalline form assumed by the solid triglyceride when my method is used.

It is a further object of the invention to provide a nut butter homogenizing agent comprising a mixture of fluid and solid oleaginous constituents containing in suspension ingredients useful in the preparation of nut and seed butters, such as salt, vitamins, anti-oxidants, sugar, and other flavoring solids. Agents of the type preferred for the practice of my invention, having a fluid to pasty consistency as prepared, are especially suitable as carriers for such additional ingredients, facilitating the introduction and uniform distribution of the ingredients in the nut butter.

Other objects and feature of the invention will be apparent from the following description and the accompanying drawings, in which Figure 1a is an X-ray diffraction pattern of a triglyceride in alpha crystalline form;

Figure 1b is an X-ray diffraction pattern of a triglyceride in beta-prime crystalline form;

Figure 1c is an X-ray diffraction pattern of a triglyceride in beta crystalline form;

Figure 2 shows time-temperature cooling curves for a mixture of 50 parts substantially completely hydrogenated peanut oil and 50 parts unhydrogenated peanut oil.

It is known that glyceride fats may be crystallized in any one of a plurality of forms, depending on the temperature and speed at which crystallization is permitted to take place. In this connection the reader is referred to Ferguson and Lutton, Chem. Rev., 29, 355 (1941) and Lutton, J. A. C. S., 67, 524 (1945) for a review of related details, especially those concerning means for identification of the various crystalline forms and their physical characteristics. Although these references deal principally with substantially pure tri-saturated glycerides, the information given can be used as a guide in determining pertinent data encountered in dealing not only with solid triglycerides produced commercially, as by hydrogenation of natural fats and oils, but also with suspensions of such solid triglycerides in liquid fatty acid esters.

It will be apparent from the above mentioned articles that the identifying terminology for the crystalline forms of fats may vary depending on the investigator, and in order that there may be no misunderstanding regarding the meaning of the terms herein used, the following definitions of the crystalline forms are submitted.

The alpha crystalline form is the least stable, lowest melting and least dense of the forms. The X-ray diffraction pattern for this crystalline form is shown in Fig. 1a and reveals a single short spacing at 4.14 Angstrom units, indicating hexagonal arrangement of the long chain axes in the crystals. The macroscopic appearance of this form is translucent.

The beta-prime form is usually intermediate between the alpha and the beta form (the latter described below) in relative stability, melting point and density. As indicated in Fig. 1b, it is in general characterized by two short spacings in the X-ray diffraction pattern, one at 4.18 Angstrom units and the other at 3.78 Angstrom units. The macroscopic appearance of the beta prime crystalline form is more opaque than alpha but less opaque than beta. In outward physical form, the beta-prime crystal has a very high length-to-breadth ratio and thus is capable of immobilizing large quantities of liquid when interlaced with other beta-prime crystals.

The beta form is the most stable, most dense, highest melting of the polymorphic forms for any hard fats. Fig. 1c shows the X-ray diffraction pattern which is characterized by prominent multiple short spacings at 4.61, 3.84 and 3.68 Angstrom units. A less prominent short spacing characteristic of the beta crystalline form also exists at 5.3 Angstrom units, but this is not designated in Fig. 1c. The macroscopic appearance of the beta crystalline form is opaque, very white, and sometimes powdery. In outward physical form, the beta crystal has a relatively low length-to-breadth ratio and appears less capable of immobilizing liquids.

As set forth in the reference articles mentioned, control must be exercised in order that a solid fat may have a desired crystalline form. Although the beta form is usually the most stable, solid triglycerides do not necessarily exist in this form for they may have solidified under conditions which do not permit the formation of beta crystals. Many normally occurring solid triglycerides, both alone and in admixture or suspension with liquid triglycerides, are constituted of a plurality of crystalline forms, the beta-prime form frequently predominating. Mixtures containing as little as about 25%, or more, of solid fats in such beta-prime crystalline form and processed under the most favorable conditions for maximum fluidity of the suspension may be fluid or pasty in nature and pumpable immediately after processing, but because the solid constituent is in the beta-prime phase they tend to set up or become plastic or solid and non-pumpable during storage at ordinary temperature, and those suspensions containing 40 to 60% solid, for example, quite rapidly become firm solids at temperatures in the range of 90–100° F. Moreover this marked tendency of such suspensions to acquire a non-pumpable plastic or solid state is accelerated by alternate heating and cooling of the suspension within normal atomspheric temperature range such as 70° F. to 100° F. Such initially fluid to pasty suspensions, therefore, may be said to lack stability against marked change in consistency within the aforementioned temperature range. Corresponding fluid to pasty suspensions in fatty oil of solid triglycerides in beta crystalline form, on the other hand, possess greatly improved stability against change to non-pumpable consistency when stored under these temperature conditions.

In the realization of the objects of the present invention it is essential to employ a normally solid fatty triglyceride which can be readily formed in the beta crystalline phase thereby permitting the preparation of a pumpable suspension thereof, but which on spontaneous cooling from melted condition crystallizes in the beta-prime or liquid immobilizing form.

Before entering into a more detailed description of the homogenizing agent or suspension employed in the invention, it seemed desirable to point out that the consistency of such suspensions may be measured with the aid of an A. S. T. M. type penetrometer employing a cone-shaped aluminum needle having the following characteristics:

Angle, 90°
Maximum diameter, 3.2 cm.
Total weight, 78.3 grams including cone, shaft and 50 grams wt.

In actual test the needle is brought to the surface of the sample, released for 5 seconds, and the penetration in tenths of a millimeter is read from a dial indicator. Consistency as measured by this method has been coordinated with viscosity in centipoises and a penetration of 100 corresponds to a viscosity of about 300,000 centipoises. Any material having a penetration as determined above of 100 or more is sufficiently fluid to be pumped with any of the commercially available pumps specifically designed for handling viscous materials, and the term "pumpable" as used herein is to be understood as designating a penetration of not substantially less than 100 and a viscosity of not substantially more than 300,000 centipoises.

The liquid fatty constituent of suspensions for use in the present invention may be an edible pure triglyceride, such as triolein, but more practical applications involve the use of natural fatty acid esters. Thus, for example, any of the naturally occurring liquid glyceride oils such as cottonseed oil, soybean oil, peanut oil, linseed oil, sunflower seed oil, corn oil, olive oil, rapeseed oil, fish oil and the like, mixtures thereof, or normally liquid fractions obtained from these or other glyceride oils may be advantageously employed. In addition normally liquid mono- or diglycerides such as monolinolein, monolinolenin, diolein, dilinolein and the like are suitable. Moreover, other normally liquid edible fatty acid esters such as sperm oil, methyl oleate, palmityl oleate, ethyl laurate and diethylene glycol monolaurate may be employed. In general the liquid constituent may be any edible oleaginous ester of a fatty acid containing at least 8 and preferably at least 12 carbon atoms in the molecule, and the term "liquid fatty ester" as used hereinafter is to be so construed.

As the solid fatty constituent of the suspensions herein contemplated, I employ a completely or substantially completely saturated triglyceride which normally tends to crystallize in the beta-prime phase but which under suitable control can be crystallized in the beta crystalline phase. Substantially completely hydrogenated peanut oil represents a fatty material from a naturally occurring source which is excellently suited for the purposes of the invention.

All substantially completely hydrogenated fats and oils do not possess the desirable crystallization characteristics required in the realization of the objects of the present invention. Some crystallize in the beta phase with extreme difficulty; others crystallize in the beta-prime phase with extreme difficulty. However, mixtures of normally solid triglycerides may be prepared in which the crystallization characteristics of one constituent dominate the crystallization characteristics of the mixture under one set of conditions, and the characteristics of the other constituent dominate the crystallization characteristics under another set of conditions. Thus a strong beta-former such as substantially completely hydrogenated soybean oil oil may be mixed with a strong beta-prime-former such as substantially completely hydrogenated cottonseed oil to obtain a mixture which under suitably controlled conditions crystallizes from the liquid phase at least about 80 per cent in the beta form (desirable for fluidity in suspension) and which under spontaneous conditions of cooling crystallizes at least about 30 per cent in the beta-prime form (desirable for immobilization of liquid).

The normally solid triglycerides which are strong beta-formers include completely saturated glycerides containing major amounts (for example, not substantially less than 40 per cent) of tristearine and/or tripalmitin and/or symmetrical palmito distearine. Naturally occurring triglycerides which on substantially complete hydrogenation give strong beta-formers are, for example, soybean oil, sunflower seed oil, linseed oil, hazelnut oil, peanut oil, olive oil, corn oil, and lard. Those triglycerides which on hydrogenation give strong beta-prime-formers are, for example, cottonseed oil, palm oil, tallow, whale oil and fish oil. Symmetrical stearo dipalmitin is also a strong beta-prime-former.

In the preparation of a mixture of substantially completely saturated triglycerides having balanced crystallization characteristics such as are essential in producing the suspensions contemplated for use herein, about 90 per cent to about 30 per cent of a strong beta-former is mixed with about 10 per cent to about 70 per cent of a strong beta-prime-former. Thus, for example, a mixture of equal parts by weight of substantially completely hydrogenated soybean and cottonseed oils may be converted into suspensions suitable for use in the stabilization and homogenization of nut butters. It is to be understood, however, that the specific proportions which give optimum balance in beta and beta-prime crystallization characteristics will of course vary depending on the beta- and beta-prime-forming tendencies of the individual components of the mixture.

Within reasonable limits the degree of saturation of the solid fatty constituents of the suspensions is not critical, although it is desirable that the iodine value be below 20. Since the beta-forming tendency of solid fat constituents decreases with increase in iodine value, those solid fats having iodine values from 0 to 10 are preferred for use in the manufacture of the suspensions herein contemplated.

The following test, designed to determine the beta- and beta-prime-forming characteristics of a fatty material, may be employed as a guide in the selection of normally solid triglycerides for use in making suspensions which are adapted for use in the stabilization of nut butters.

Several thin-wall glass capillaries (about 1 mm. outside diameter) are charged with about a centimeter length of the molten fatty ester to be tested. The alpha softening point and the maximum melting point are then determined by methods used by Lutton (J. A. C. S., 67, 524 (1945)).

To determine the alpha softening point a sample in its capillary tube is first completely melted at 100° F. then chilled for 2 seconds at 0° C. The sample is then thrust into a bath held at a temperature in the range of the expected softening point. The procedure is repeated employing baths at various trial temperatures. On each trial it is noted whether there is or is not increased translucence of the fat sample. The recorded alpha softening point is the average of the lowest temperature where increased translucence is observable and the highest temperature at which it is definitely not observable.

To determine the maximum melting point, the sample of fatty ester in its capillary is melted at 100° C., then chilled at 0° C. for 2 to 60 seconds. The sample is then held for 4 hours at 1° to 2° C. below the alpha softening point to effect solid transformation to a higher melting form and for 15 to 20 hours at a temperature 10° C. higher to insure transformation to the highest melting crystalline form, then is transferred to a melting point bath and the complete melting point determined at a heating rate of 0.2° C. per minute.

With the data thus obtained the beta-forming characteristics of the fatty material and its suitability for use in making pumpable suspensions may be determined as follows.

One of the capillary samples of hard fat is melted at 100° C., then chilled at 0° C. for 2 to 60 seconds. The sample is stored for 4 hours at a temperature which is 1.5° to 2.5° C. above the average of the alpha softening point and the maximum melting point to effect recrystallization in a higher melting crystalline form. If difficulty is encountered in effecting such recrystallization in this tempering step, then it will be advantageous to first store the chilled sample for 2 hours at 1°–2° C. below the alpha softening point. An X-ray diffraction pattern of the sample is then obtained at room temperature and if this pattern indicates that the sample is 85 per cent or more in the beta crystalline form, the fatty material is suitable for use in producing a pumpable suspension.

Normally solid triglycerides which are useful in the present invention must satisfy not only the above test as to beta-forming characteristics but also the following test as to beta-prime-forming characteristics.

One of the capillary samples of hard fat is melted at 100° C., then chilled for 2 to 60 seconds at 0° C. The sample is then stored for 2 hours at the alpha softening point. An X-ray diffraction pattern of the sample is then obtained at room temperature. (If the pattern cannot be obtained immediately, it is preferable to store the sample at 50° F. to preserve existing crystalline structure.) If the X-ray pattern indicates that the sample is 30 per cent or more in the beta-prime crystalline form, the original hard fat in suitable suspension is capable of stabilizing nut butters against oil separation in accordance with the present invention.

Nut butter homogenizing or stabilizing agents herein contemplated may be prepared by cooling a completely liquid mixture of the normally solid triglyceride and liquid fatty ester to a temperature at which crystallization begins, then controlling the temperature of the mixture so that the solid triglyceride crystallizes in the beta crystalline form as the temperature is reduced to the normal range of room temperature, such as below 100° F. Except in specific cases the temperature at which such crystallization should be permitted to take place cannot be stated positively since it will depend on the proportion and kind of normally solid triglyceride dissolved in the liquid mixture. However, a suitable crystallization temperature for any such liquid mixture will be found to be not substantially lower than the average of the alpha softening point and the maximum melting point of that mixture and these physical characteristics may be determined by the procedures previously described. I have chosen to call this average temperature, or in other words the lowest temperature of crystalization at which beta crystals form in sufficient quantity to yield a product having a pumpable nature as herein defined, the "minimum beta crystallization temperature." In use of the word "minimum" I do not wish to imply that no beta crystals can form at lower temperatures but rather that at such lower temperatures insufficient beta crystals are formed to give the suspensions the substantially permanently pumpable characteristics herein defined. Use of temperatures below the minimum beta crystallization temperature will of course favor the crystallization of the solid triglyceride in the beta-prime or alpha crystalline form, and as previously pointed out such crystalline forms are to be avoided if the optimum is to be realized in pumpable suspensions of the present invention. In practice it is preferable that crystallization be permitted to take place at a temperature from 0° to 2° C. above the minimum beta crystallization temperature and in this connection it is to be noted that the minimum beta crystallization temperature changes with change in composition of the mother liquor, becoming lower as crystallization of solid triglycerides progresses. At any stage in the cooling cycle, therefore, the temperature is maintained not substantially below the minimum beta crystallization temperature of the mother liquor and preferably from 0° to 2° C. above. The minimum beta crystallization temperatures for a melted mixture of 50 parts hydrogenated peanut oil of 8 iodine value and 50 parts refined and filtered peanut oil, for example, is about 56.5° C. It is to be understood, however, that this temperature may vary appreciably with variations in constituents.

In order to speed up the formation of crystals and thus reduce the over-all time of the cooling cycle, the melted mixture may be seeded by adding thereto preformed crystals of solid triglyceride or solid triglyceride in powdered form. It is also permissible to supercool the melted mixture and effect the formation therein of a slight cloud of crystalline material. These seeding crystals may be in alpha, beta-prime, or beta form but irrespective of their form, subsequent precipitation of the solid triglyceride will be in the desired beta crystalline form provided the temperature is not substantially below the minimum beta crystallization temperature of the mother liquor. To a large extent those solid crystals which may be present in the beta-prime or alpha crystalline form will be transformed in the solid phase at the beta crystallization temperature so as to have X-ray diffraction patterns characteristic of the beta phase, but even though the X-ray pattern may indicate existence in the beta phase, the outward physical characteristics of the crystals, and their relative stiffening power, tend to remain those of the alpha or beta-prime crystals. Therefore, in the preparation of suspensions for use in the present invention by the method of cooling a melted mixture of the solid triglyceride and the liquid fatty ester, it is essential that the formation of alpha or beta-prime crystals be held to a minimum both during the initial stages of crystallization and subsequently, tolerances being given more fully below. Such minimum alpha or beta-prime crystal formation may be accomplished by maintaining the temperature of the mix at or slightly above the minimum beta crystallization temperature of the mother liquor throughout the entire cooling cycle as previously pointed out, and if the melted mixture is seeded by supercooling in the initial stages, whereby alpha or beta-prime crystals may be formed, then it is preferable to adjust the temperature of the seeded mix to a temperature at or slightly above the minimum beta crystallization temperature as soon as the seed is formed. For reasons herein indicated it is very desirable that the mixture of solid triglyceride in liquid fatty ester be completely melted in order to destroy all crystal nuclei before beginning the cooling cycle.

The invention will be more clearly understood if examples are given now and before variation in details are discussed. It is to be understood, however, that these examples are merely illustrative of the products of the invention and of methods of producing the same, and that the invention is not limited thereto but rather is defined by the appended claims. Parts are by weight.

*Example I.*—A mixture of 50 parts hydrogenated peanut oil (8 iodine value) and 50 parts refined and filtered peanut oil (90 iodine value) was mechanically agitated and heated to 65° C., at which temperature the mixture was completely liquid. With the aid of an external water cooling bath (suitable cooling coil arrangement may be employed), the mixture was then cooled to 58° C. (1.5° above the minimum beta crystallization temperature of 56.5° C. for this mix) and held at that temperature without substantial variation for one hour and ten minutes to permit crystallization of insoluble high melting triglycerides, mechanical agitation being continued throughout. While still being agitated, the mixture of fat crystals in liquid oil was then uniformly cooled to 40° C. over a period of about 3 hours, then held at 40° C. for an additional period of about one hour. Thereafter the mixture was cooled to a packing temperature of about 26° C. in about 30 minutes. Curve 17 of Fig. 2 represents graphically the time-temperature cycle in the processing according to this example.

The mixture so produced was a semi-fluid, pumpable, homogeneous suspension of solid triglyceride crystals in liquid triglyceride, and from X-ray patterns it was judged that over 90% of the solid triglyceride crystals were in the beta crystalline form. Not only was the mixture pumpable as prepared, but it retained a pumpable consistency after storage at 100° F. for several days, penetration at the end of 7 days at 100° F. being 143. When this same suspension was heated above its melting point and allowed to cool spontaneously without agitation it set up to a firm non-pumpable mass.

To 100 parts by weight of the suspension so prepared were added and incorporated 50 parts by weight of finely divided salt (sodium chloride of from 100 to 200 mesh). The salted mixture was still readily pumpable at normal temperatures, and thus suitable for use as a homogenizing agent in the preparation of nut butter.

Roasted peanuts from which the hearts and red skins had been removed were placed on a continuous conveyor and heated in transit to about 49° C. by a suitable heat source, for instance infra-red lamps. The peanuts were delivered by the conveyor to the hopper of a continuous grinder, to which was concurrently and continuously pumped the salted suspension above described at a rate such that the amount of suspension so introduced was 3 per cent by weight of the nut kernels. During the grinding operation, the fatty suspension was thoroughly mixed with and uniformly distributed on the nut particles and within the expressed natural oil. The heat of friction developed in the grinder raised the temperature of the contained mixture, and the nut butter, containing the suspension in intimate admixture, was discharged from the grinder at a temperature of about 70° C. The discharged butter was placed in containers and permitted to cool to room temperature without further agitation. Since the temperature of discharge of the butter was sufficiently high to render the fatty components of the mixture completely liquid, thus destroying all crystal nucleii of the solid triglyceride of the added suspension, this solid triglyceride, on subsequent spontaneous cooling of the butter, crystallized in a form having high stiffening or immobilizing power. No segregation of the fluid and solid constituents of the butter was observed after storage for several months.

The details of butter formation, just described, constitute no part of the instant invention and may be widely varied. By reason of the pumpable consistency of the fatty suspensions employed as the homogenizing agent, a much wider range of processing conditions and apparatus are made available than if the agent consisted of a fatty solid, or a mixture of fatty solid and liquid constituents prepared by methods hitherto employed.

The constituent of the suspension which effects stabilization is, of course, the solid triglyceride and in general, the finished nut butter product may be satisfactorily stabilized by as little as 1% by weight of solid triglyceride (based on the nuts). It is usually unnecessary to employ more than 2%. The required amount varies with several factors, one factor being the size of the solid nut particles in the ground butter. A finely ground butter in general is less subject to segregation and requires less solid triglyceride to effect stabilization. However, the quantity required for stabilization is also dependent on the amount of free oil liberated on grinding, larger quantities of free oil requiring larger proportions of solid triglyceride.

The nature of the hard fat is another factor affecting the amount of hard fat that is used in inhibiting segregation, some fats exerting a greater stiffening action than others, probably because of increased tendency to form beta-prime crystals on uncontrolled cooling from a fluid state. Hydrogenated peanut oil is readily crystallized in either of these forms with appropriate treatment. Mixtures of beta-formers, such as hydrogenated soybean oil, with beta-prime-formers, such as hydrogenated cottonseed oil, will vary in tendency to form beta-prime crystals depending on the relative proportions of the components. It will be perceived, therefore, that the required amount of hard fat will vary, but the required amount may be readily determined for any given nut butter and any selected fat or mixtures of fat.

Similarly, the nature of the other constituents in the fatty suspension of solid triglyceride may affect the consistency of the nut butter. For example, the addition of salt or other solid ingredient usually tends to stiffen the mixture. Moreover, a high proportion of liquid oil, as indicated above, will tend to make the product more fluid and more susceptible to segregation during storage.

In general, to insure pumpability of the suspension and adequate stabilizing power, the proportion of suitable solid triglyceride should be from not substantially less than 25% to not substantially more than 60% of the solid and liquid fatty material of the suspension. Expressed another way the iodine value of the fat mixture should not be substantially greater than 66, or less than about 42. The total solids, including added solid ingredients, should not substantially exceed about 70% of the mixture for satisfactory results.

It will be appreciated that while the invention finds its widest application in the preparation of peanut buttter, it is equally applicable to the processing of other oleaginous nut and seed butters, for example butters prepared from pecans, almonds, walnuts, cashew nuts, sesame seed, and soy beans. The term "nut," unless otherwise qualified, is employed herein to designate both nuts and seeds of the oil-bearing type.

*Example II.*—A mixture of peanut oil and hydrogenated peanut oil as employed in Example I was prepared and heated to 81° C. to melt solid constituents completely. During the following cooling cycle the mixture was mechanically agitated so as to prevent undue crystal growth and interlacing of crystals without substantial incorporation of air. The mixture was first supercooled to 56° C. The temperature was immediately allowed to rise to 58° C. where it was held without substantial variation for one hour and thirty-five minutes, crystallization of solid triglyceride in the beta form being allowed to take place. Thereafter further crystallization was promoted by cooling the mixture to 40° C. over a period of 3 hours and 30 minutes. The mixture was held at 40° C. for one hour and then cooled to a packing temperature of 28° C. in 30 minutes. Curve 19 of Fig. 2 represents graphically the time-temperature cycle in the processing according to this example.

The X-ray pattern of the product produced in accordance with this example indicated that over 90% of the crystallized product was in the beta crystalline form. The suspension was semifluid and pumpable as produced, and, although it slowly increased somewhat in viscosity, it retained pumpable characteristics even after storage at 100° F. for several days, the penetration at the end of 7 days being 153. As in the case of the product prepared in accordance with Example I, this product, when completely melted and allowed to cool spontaneously without agitation, set up to a firm non-pumpable mass.

When the suspension produced in this Example II was salted and ground with peanuts, for instance as described in connection with Example I, the resulting butter retained its homogeneity for many months; no marked change was observed in the consistency of a small batch from which portions were removed from time to time, as in ordinary consumption, the butter remaining soft and palatable. Olive oil or diolein may be substituted for the peanut oil as the liquid constituents in Examples I and II.

The following additional examples deal with varying methods of producing suspensions useful in the manufacture of improved nut butters as hereinbefore described, it being understood that the products so formed may be supplied with salt and other nut butter ingredients prior to incorporation in the butter.

*Example III.*—1,000 g. of a mixture of 33% of hydrogenated peanut oil (iodine value 10) and 67% of nonhydrogenated peanut oil (iodine value 90), is heated to melt it (58–61° C.) in a mechanical mixer of 3,000 cc. capacity, then cooled to 50–55° C. with the aid of a water bath. At 50°–55° C. the oleaginous mixture is agitated by stirring slowly, while cooling is permitted to take place. The temperature of the mass will drop to 48° to 50° C. The water bath is adjusted so that the temperature of the oleaginous mixture does not drop below 48° C. Agitation is slowly continued until all latent heat is given off.

During this period of heat dissipation the temperature will rise to 53° to 55° C. as minute, solid particles form in the liquid phase. After reaching 55° C. the temperature of the mass will steadily drop to 48° C. During this period slow agitation is maintained. The mass is cooled further and when the temperature reaches substantially 40° C. at which point the viscosity is sufficient to suspend salt, 15 parts of salt (sodium chloride) are added per 100 parts of the hydrogenated constituent. When the temperature of the mass reaches 35° C. the bath may be set at room temperature (25° C.). Agitation is continued throughout until room temperature is reached.

The product thus prepared was pumpable and had reasonably good resistance against change to non-pumpable consistency but had greater tendency to develop a firmer consistency at 100° F. than did the products of the previous examples. Peanut butter is rendered completely stable against separation by the incorporation of 5 per cent of this suspension in the grinding operation under conditions which effect complete melting of the solid triglyceride constituent. The suspension of this example may also be employed to stabilize pecan nut butter or a butter spread prepared by grinding soy beans.

*Example IV.*—Hydrogenated cottonseed oil (8 iodine value) and hydrogenated soybean oil (8 iodine value) were separately spread in thin films over cooled rolls and removed in flake form. Each product was tempered for 3 days at 60° C., for 2 hours at 49° C., and for one hour at 38° C. The flakes were then separately cooled to room temperature and pulverized to a powder sufficiently fine to pass a 100 mesh screen, care being taken to avoid melting the product while powdering. As judged from X-ray patterns, the hydrogenated cottonseed oil powder was 50% in the beta crystalline form and 50% in the beta-prime crystalline form, and the hydrogenated soybean oil product was 100% in the beta crystalline form.

A mixture of 30% by weight of the hydrogenated cottonseed oil powder and 70% by weight of the hydrogenated soybean oil powder was prepared. One part by weight of this preparation was mixed with one part by weight of refined and bleached peanut oil and one part by weight of powdered sodium chloride (about 100 to 150 mesh). The product was pumpable as prepared and remained pumpable after heating at 100° F. for one day.

The product could be used substantially as set forth in Example I, to stabilize peanut butter.

*Example V.*—50 parts by weight of hydrogenated cottonseed oil (8 iodine value) and 50 parts by weight soybean oil (8 iodine value) were mixed and melted together. The melted fat mixture was solidified in thin layers by passage over a chilled roll. The chilled product was broken up into particles about one-half inch to one inch square, then tempered for 3 days at 60° C., for 2 hours at 49° C. and for one hour at 38° C. The sample was pulverized as in Example III. As judged from an X-ray diffraction pattern on the pulverized fat, the crystalline form was 10% beta-prime and 90% beta.

One part by weight of the powdered hard fat was mixed with one part by weight of refined and bleached peanut oil and one part by weight of powdered sodium chloride (100–150 mesh). The suspension thus prepared was pumpable and remained pumpable after storage at 100° F.

The consistency of the suspension and its effectiveness in stabilizing peanut butter against gravitational separation on storage was about the same as that suspension prepared under Example I from hydrogenated peanut oil.

Practice of the invention is not limited to the specific conditions set forth in the above examples and may be varied over a wide range, as indicated by the following discussion.

According to the results of a detailed study of the homogenizing agents of my invention, it is preferable that at least about 85 per cent of the solid triglycerides of the suspension, as judged by the relative intensities of short spacing lines in X-ray diffraction pattern, exist in the beta phase, and in addition have the outward physical characteristics of beta crystals. Such high beta content is especially desirable in the preparation of pumpable compositions containing 50 per cent to 60 per cent normally solid triglyceride. When compositions containing lower proportions of solid triglyceride such as 30 per cent are contemplated, the content of beta crystals of the solid triglyceride may be somewhat lower, but preferably at least about 80 per cent.

When suspensions for use in the present invention are prepared by cooling a mixture of the normally solid triglyceride and normally liquid fatty ester, the mixture should be agitated during the period in which crystallization takes place. Although mechanical agitation is preferred because of ease of control, other means of agitation including circulation induced by pump pressure may be employed.

Such agitation insures uniform cooling of the triglyceride mixture and, during the period of crystallization, especially minimizes the formation of highly branched crystal clusters whereby interlacing of individual crystals and occlusion and immobilization of mother liquor may result with accompanying stiffening of the suspension. For production of substantially permanently pumpable suspensions in which solid remains uniformly distributed throughout the mother liquor it is desirable that the solid triglyceride be present in particulate form as separate crystals or as compact crystal clusters rather than as open and highly branched clusters. The degree of agitation necessary to accomplish this end is not critical, but it is usually preferable to avoid vigorous agitation such as would incorporate a substantial amount of air in the suspension of solid in extremely fine form, both of which conditions may ultimately result in an undesirable firming of the product.

In the event crystallization of the solid triglyceride in the beta phase is conducted under conditions whereby clusters of crystals result, the suspensions may be improved by breaking the clusters into smaller particle form and redistributing the solid in the mother liquor. Although simple mechanical agitation may sometimes suffice to effect this reduction in particle size, it is preferable to pass the suspension through a wet grinding mill which accomplishes the desired end in a more positive and efficient manner. With reference to the use of wet grinding mills for reduction in size of the solid triglyceride particles, and bearing in mind the processes of Examples IV and V, it has been found that the suspensions herein contemplated may be prepared by effecting mechanical subdivision to desired particulate form of solid triglycerides which are in the beta phase and which may be suspended in liquid fatty esters during or after such mechanical subdivision.

While I have referred to the suspensions of the present invention as having substantially permanent pumpability over the normal range of room temperature such as 70°–100° F., it is to be borne in mind that at the higher temperatures in this range the suspended solids, especially those particles of very small size, tend to redissolve in the mother liquor and crystallize on existing suspended solids, and thereby tend to form clusters of interlaced crystals which may immobilize the mother liquor and cause increase in viscosity of the product. This tendency toward increase in viscosity is comparatively slight when the suspended solid triglyceride is in the beta phase and thus in the case of the products of the present invention it does not interfere with their use under normal conditions of commercial practices because storage or use at or near 100° F. for prolonged periods exceeding several weeks is not customarily encountered.

Although the technique employed in those of the above examples involving crystallization from the melt during agitation yields suspensions in which very little air has been incorporated, nevertheless it has been noted that amounts of air as high as 15 per cent in the finished product are not seriously harmful. The incorporation of gases such as air tend to make the product less fluid and less easily pumped, but the presence of some air, or other gas such as nitrogen or carbon dioxide, in the product has the advantage of rendering the product more stable with regard to pumpable consistency in the ordinary range of room temperature, and of giving the product a whiter appearance. However, a governing factor relative to incorporation of gases, aside from the tendency of the gases to stiffen the oleaginous product, is the ultimate use to which the product is to be put and it is to be borne in mind that any free oxygen may tend to cause rancidity or off-flavor where unsaturated and oxidizable materials are present.

Suspensions comprising as the oleaginous constituent a mixture of substantially completely hydrogenated peanut oil and refined and filtered peanut oil having an iodine value in the range of 42–66 are of particular value and specifically a suspension prepared from one part hydrogenated peanut oil of 8 iodine value, one part refined and filtered peanut oil, and one part sodium chloride has been found to possess outstanding merit. The effectiveness of such a suspension in preventing aggregation is especially high; the amount used need be only sufficient to introduce about one per cent hard fat into the nut butter.

Ease of handling is an outstanding advantage in any compounding operations, whether in food manufacturing plants or in non-edible outlets. Because the products of the present invention are pumpable at normal room temperatures, they are both easily removed from containers and easily mixed with additional ingredients such as other liquids or subdivided solid matter without the application of heat.

This application is a continuation-in-part of my copending application Serial No. 642,097, filed January 18, 1946, now abandoned.

Having thus described the invention, what is claimed as new and desired to be secured by Letters Patent is:

1. An oleaginous composition comprising essentially a minor proportion of finely divided sodium chloride substantially homogeneously dispersed in a major proportion of a suspension of normally solid fatty acid triglyceride in particulate form in normally liquid ester of fatty acid containing at least 8 carbon atoms in the molecule, said triglyceride being at least 80% in the beta crystalline form and constituting not substantially less than 25 and not substantially more than 60% by weight of the fatty constituents, the crystals being in substantially non-interlacing relationship, said composition having, throughout the temperature range of 70° to 100° F., (1) a flowable and pumpable consistency, (2) a viscosity of not more than 300,000 centipoises, (3) a penetration of at least 100, being capable of retaining such properties during storage within said temperature range for a period of at least seven days and of setting to a nonpumpable solid when melted and spontaneously cooled to about 70° to about 100° F and containing not substantially more than about 70% by weight of total solids.

2. The composition of claim 1 wherein the solid triglyceride is capable of forming at least 30% of crystals in the beta prime phase upon melting and then cooling the mixture spontaneously.

3. The composition of claim 1 wherein the solid triglycerides are at least 85% in the beta crystalline phase.

4. The composition of claim 1 wherein the solid triglyceride is hydrogenated peanut oil.

5. The composition of claim 1 wherein the solid triglyceride is a mixture of hydrogenated cottonseed oil and hydrogenated soybean oil.

6. The composition of claim 1 wherein the solid triglyceride, the fatty ester, and the salt each constitute a minor proportion of the whole.

PAUL J. MITCHELL, JR.

REFERENCES CITED

The following references are of record in the file of this patent:

UNITED STATES PATENTS

| Number | Name | Date |
| --- | --- | --- |
| 1,395,934 | Stockton | Nov. 1, 1921 |
| 1,911,222 | Bollens et al. | May 30, 1933 |
| 2,442,532 | Eckey | June 1, 1948 |